(12) United States Patent
Medeiros et al.

(10) Patent No.: US 12,395,886 B2
(45) Date of Patent: Aug. 19, 2025

(54) METHODS AND APPARATUS FOR TRANSMITTING RADIO DATA OVER A FRONTHAUL NETWORK

(71) Applicant: Telefonaktiebolaget LM Ericsson (PUBL), Stockholm (SE)

(72) Inventors: Eduardo Medeiros, Stockholm (SE); Igor Almeida, Indaiatuba SP (BR); André Mendes Cavalcante, Indaiatuba SP (BR); Elmar Trojer, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 203 days.

(21) Appl. No.: 17/423,806

(22) PCT Filed: Jan. 21, 2019

(86) PCT No.: PCT/EP2019/051367
§ 371 (c)(1),
(2) Date: Jul. 16, 2021

(87) PCT Pub. No.: WO2020/151800
PCT Pub. Date: Jul. 30, 2020

(65) Prior Publication Data
US 2022/0110017 A1    Apr. 7, 2022

(51) Int. Cl.
*H04W 28/02* (2009.01)
*H04L 69/08* (2022.01)

(52) U.S. Cl.
CPC ......... *H04W 28/0289* (2013.01); *H04L 69/08* (2013.01); *H04W 28/0284* (2013.01)

(58) Field of Classification Search
None
See application file for complete search history.

(56) References Cited

U.S. PATENT DOCUMENTS

| 9,525,482 B1 | 12/2016 | Tse |
| 9,998,310 B2 | 6/2018 | Barbieri et al. |

(Continued)

FOREIGN PATENT DOCUMENTS

| CN | 101547526 A | * | 9/2009 |
| CN | 101686075 A | * | 3/2010 |

(Continued)

OTHER PUBLICATIONS

CPRI Press Release <https://web.archive.org/web/20180814132558/http://www.cpri.info/press.html> Jun. 25, 2018.*

(Continued)

*Primary Examiner* — Andrew C Oh
(74) *Attorney, Agent, or Firm* — Sage Patent Group (57) ABSTRACT

Embodiments described herein relate to methods and apparatus for transmitting radio data over a fronthaul network. The method comprises receiving radio data for transmission over the fronthaul network; and translating the radio data between a time domain multiplexing protocol and packet based protocol before transmitting the data over the fronthaul network; wherein the step of translating comprises: receiving control information indicative of a level of congestion over a part of the radio network using the packet based protocol; and modifying the radio data during the step of translating to control the level of congestion.

20 Claims, 5 Drawing Sheets

(56) References Cited

U.S. PATENT DOCUMENTS

| | | | | |
|---|---|---|---|---|
| 10,009,673 | B1* | 6/2018 | Liu | H04W 88/085 |
| 2009/0290632 | A1* | 11/2009 | Wegener | H03M 7/30 |
| | | | | 375/240 |
| 2012/0236916 | A1* | 9/2012 | Kobayashi | H04L 27/2662 |
| | | | | 375/224 |
| 2013/0100948 | A1* | 4/2013 | Irvine | H04W 88/085 |
| | | | | 370/350 |
| 2014/0112140 | A1* | 4/2014 | Chan | H04L 47/32 |
| | | | | 370/235 |
| 2014/0171063 | A1* | 6/2014 | Mori | H04W 52/20 |
| | | | | 455/424 |
| 2014/0287707 | A1* | 9/2014 | Suzuki | H04B 1/1036 |
| | | | | 455/258 |
| 2014/0349640 | A1* | 11/2014 | Fujita | H04W 24/00 |
| | | | | 455/425 |
| 2016/0080027 | A1* | 3/2016 | Agata | H04W 72/23 |
| | | | | 370/329 |
| 2016/0337062 | A1* | 11/2016 | Ruffini | H04J 3/0667 |
| 2017/0064661 | A1* | 3/2017 | Katagiri | H04J 3/0667 |
| 2017/0237831 | A1* | 8/2017 | Yang | H04B 1/66 |
| | | | | 370/230 |
| 2018/0041327 | A1* | 2/2018 | Wolff | H04L 5/1492 |
| 2019/0089478 | A1* | 3/2019 | Effenberger | H04B 10/25753 |
| 2019/0097914 | A1* | 3/2019 | Zhong | H04J 3/1658 |
| 2020/0076521 | A1* | 3/2020 | Hammond | H04B 17/0087 |

FOREIGN PATENT DOCUMENTS

| | | | | | |
|---|---|---|---|---|---|
| CN | 101730307 | A | * | 6/2010 | H04W 28/06 |
| CN | 103260198 | A1 | | 8/2013 | |
| CN | 103326771 | A | * | 9/2013 | |
| CN | 103368639 | A | * | 10/2013 | |
| CN | 104507154 | A | * | 4/2015 | H04J 3/06 |
| CN | 104780150 | A | * | 7/2015 | |
| CN | 105981349 | A | * | 9/2016 | H04L 61/6059 |
| CN | 109714070 | A | * | 5/2019 | H04B 1/38 |
| CN | 111082957 | A | * | 4/2020 | H04L 41/0631 |
| DE | 102013227070 | B4 | * | 3/2019 | H04W 28/06 |
| EP | 3599725 | B1 | * | 9/2020 | H01Q 3/24 |
| EP | 3531638 | B1 | * | 9/2022 | H04L 47/12 |
| JP | 2014230175 | A | * | 12/2014 | H04M 1/24 |
| JP | 2017085473 | A | * | 5/2017 | H04W 56/001 |
| KR | 20160039621 | A | * | 4/2016 | |
| WO | WO-2010035496 | A1 | * | 4/2010 | H04L 1/1887 |
| WO | 2012 171133 | A1 | | 12/2012 | |
| WO | WO-2013189553 | A1 | * | 12/2013 | H04L 12/4633 |
| WO | WO-2014076004 | A2 | * | 5/2014 | H04B 10/25758 |
| WO | WO-2015176242 | A1 | * | 11/2015 | H04L 12/4633 |
| WO | 2016 145371 | A2 | | 9/2016 | |
| WO | 2016 145371 | A3 | | 9/2016 | |
| WO | WO-2017088911 | A1 | * | 6/2017 | H04J 3/1611 |
| WO | WO-2017101084 | A1 | * | 6/2017 | H04L 29/08027 |
| WO | WO-2018093301 | A1 | * | 5/2018 | H04L 25/0202 |
| WO | WO-2019035750 | A1 | * | 2/2019 | G06F 9/45558 |
| WO | WO-2019071870 | A1 | * | 4/2019 | H04B 10/27 |
| WO | WO-2019091587 | A1 | * | 5/2019 | H04L 12/5601 |

OTHER PUBLICATIONS

ECPRI Specification V1.2 (Jun. 25, 2018).*
3GPP TR 38.801 v1.1.0; Technical Report; 3rd Generation Partnership Project; Technical Specification Group Radio Access Network; Study on New Radio Access Technology; Radio Access Architecture and Interfaces (Release 14) Jan. 2017.
CPRI, Common Public Radio Interface; Industry leaders releasing a new functionality for the eCPRI Specification for 5G—eCPRI 2.0—Jun. 25, 2018.
CPRI Specification v7.0; Interface Specification; Common Public Radio (CPRI); Interface Specification—Oct. 9, 2015.
Ericsson Technology Review, 4G/5G RAN Architecture, How a Split Can Make the Difference; Charting the Future of Innovation, vol. 93|#6—2016.
PCT Notification of Transmittal of the International Search Report and the Written Opinion of the International Searching Authority, or the Declaration issued for International application No. PCT/EP2019/051367—Sep. 20, 2019.

* cited by examiner

METHODS AND APPARATUS FOR TRANSMITTING RADIO DATA OVER A FRONTHAUL NETWORK

PRIORITY

This nonprovisional application is a U.S. National Stage Filing under 35 U.S.C. § 371 of International Patent Application Serial No. PCT/EP2019/051367 filed Jan. 21, 2019 and entitled "METHODS AND APPARATUS FOR TRANSMITTING RADIO DATA OVER A FRONTHAUL NETWORK" which is hereby incorporated by reference in its entirety.

TECHNICAL FIELD

Embodiments described herein relate to methods and apparatus for transmitting radio data over a fronthaul network. In particular, there is provided a node in a fronthaul network for translating traffic from a time domain multiplexing based protocol to a packet based protocol.

BACKGROUND

In 3GPP Radio Access Network (RAN), a (remote) radio unit (RRU or RU) and a baseband unit (BBU) can either be deployed together at the radio site, or BBUs can be centralized at a baseband hotel for better utilization. The first deployment option is called distributed RAN (DRAN) whereas the latter is called centralized RAN (CRAN) or main-remote deployment. The connection between RRU and BBU is referred to as a fronthaul (FH) network.

A commonly used interface for the fronthaul network is the Common Public Radio Interface (CPRI) that uses a non-packet based time-division multiplexing (TDM) data protocol on dedicated point-to-point (p2p) links (for example fiber or microwave) to transport a digital representation of antenna carrier (AxCs) signals. The CPRI protocol may also be described as a serial protocol, a time synchronous protocol and/or a streaming protocol.

CPRI, as specified by CPRI forum, has become the industry standard for fronthaul (FH) networking in 3GPP radio systems and is widely adopted by all RAN vendors. It is radio access technology (RAT) agnostic and exists for Global System for Mobile communication (GSM), Wideband Code Division Multiplexing Access (WCDMA), Long Term Evolution (LTE), and also 5G technology generations.

CPRI specifies the protocol for the current RRU-BBU FH interface, transporting the baseband in phase and quadrature (10) samples and the related control signaling. Such an RRU-BBU function split is often referred to as an RF-PHY split, as Radio Frequency (RF) functions are in RRU while the processing of Physical Layer (PHY) and above layers are done in the BBU. This split provides an efficient way for main-remote deployments to distribute radio functionality to RRUs while centralizing baseband functionality to BBUs.

The CPRI provides means for multiplexing, de-multiplexing and managing AxC signals between BBU and RRUs supporting all existing Radio Access Technologies (RATs), transmission modes (frequency domain duplex—FDD, time-domain duplex—TDD), and signal configurations (carrier bandwidth, layers of diversity/multiple-input multiple-output (MIMO), spatial beam-forming, etc.) in a source synchronous stream format over electrical (lower rates) and optical interfaces.

The CPRI protocol frames IQ time-domain antenna signal samples (AxC data), synchronization, fast L1 signaling, and/or configuration and management (C&M) channel, and allows for vendor specifics and protocol extension. With all this functionality in a duplex p2p fiber (p2p, daisy-chain, ring, star), CPRI may be considered to provide an efficient solution.

The IEEE 1914.3 standard for radio over ethernet (RoE) specifies means to build radio frequency (RF)—Physical Layer (RF-PHY) split base stations that are connected by Ethernet links instead of synchronous serial links as in CPRI. Nodes (for example access nodes) are provided in the fronthaul network that provide network functions that translate between CPRI and RoE links. Such a node may be configured to extract time domain multiplexing data from a CPRI stream and assemble it in packets. Conversely, such a node may be configured to take packets received in RoE and reassemble a CPRI stream from the contents of the packets.

The current CPRI-type of fronthaul network with RF-PHY split is costly in terms of bitrate for 5G deployment with a larger carrier bandwidth (e.g. Nx100 MHz vs. Nx20 MHz in LTE) and a huge number of antennas in a smart planar array (e.g. 64, 128, 256 vs. 6 to 16 at LTE) for spatial beamforming. The required fronthaul capacity may be increased by at least 40 times, even 160 times as it scales with the number of antennas.

To address the requirement for capacity growth in the fronthaul network, there are some technical solutions. Firstly the data may be compressed to keep the current RF-PHY split. This facilitates reusing most of the existing design in RRU and BBU. Herein a compressed CPRI interface is referred to as a C1 interface. Alternatively, a solution may be to use another functional split at a higher position on the protocol stack may be used. For example, one functional split may be between MIMO processing (e.g. beamforming) and user-layer processing. In this example, in uplink direction, a new Radio Unit, referred to as an RBU (radio baseband unit) as it performs some baseband functionalities, transforms the AxC signal (i.e. Orthogonal Frequency Division Multiplexing (OFDM)) to frequency domain first by Fast Fourier Transform (FFT), performs beamforming or multiple input multiple output (MIMO) processing to separate user layers; and then transports the processed user-layer samples back to a new baseband unit, referred to as a BPU (baseband processing unit).

The interface between the RBU and BPU is referred to herein as the lower layer split (LLS) interface (named C2, or xRAN LLS) and it scales with the number of layers (independent MIMO streams) instead of scaling with the number of antenna streams.

In addition to a CPRI interface, an evolved CPRI interfaces specification, short eCPRI, is included that allows transmission of LLS data (C1, C2, etc) user plane and radio-related control plane data over a packet network (L2 Ethernet network, L3, L3 IP network, L4 MPLS network, etc.). This may allow for the introduction of large-volume Ethernet technology into the fronthaul domain to cut cost, but also to gain from statistical multiplexing in a packet network with shared trunk lines.

To support the new fronthaul design for 5G, CPRI cooperation is standardizing a new fronthaul protocol as eCPRI, to support efficiently different functional splits (e.g. within PHY layer) and Ethernet transport. Also, the open Radio Access Network (oRAN) alliance is specifying open interfaces to allow RRUs and BBUs from different vendors to interoperate on the same packet network.

A RRU may be configured to integrate an adaptive compression method. For example, the RRU may support time domain and frequency domain based fronthaul. Compression parameters may be adjusted automatically based on information about fronthaul, obtained through measurements or direct indication by Radio Access Network (RAN) nodes (RRU, BBU).

Up until Long Term Evolution (LTE, 4G), the fronthaul network was a self-contained solution (control, sync and user plain in one streaming protocol), but in 5G NR this has evolved into a fronthaul packet networking technology, based on packet flows separating sync (e.g. IEEE 1588), partly control (e.g. IEEE 802.1ag Ethernet CFM) and radio-related user data (e.g. I/O antenna carriers, layers, user-data).

SUMMARY

According embodiments described herein there is provided a method in a node in a fronthaul network of a radio network. The method comprises receiving radio data for transmission over the fronthaul network; and translating the radio data between a time domain multiplexing protocol and packet based protocol before transmitting the data over the fronthaul network; wherein the step of translating comprises: receiving control information indicative of a level of congestion over a part of the radio network using the packet based protocol; and modifying the radio data during the step of translating to control the level of congestion.

According to some embodiments there is provided a node in a fronthaul network of a radio network. The node comprises processing circuitry configured to: receive radio data for transmission over the fronthaul network; and translate the radio data between a time domain multiplexing protocol and packet based protocol before transmitting the data over the fronthaul network; wherein the processing circuitry is configured to translate the radio data by: receiving control information indicative of a level of congestion over a part of the radio network using the packet based protocol; and modifying the radio data during the step of translating to control the level of congestion.

DESCRIPTION

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology may additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

In order to utilize the same packet based fronthaul network, the legacy CPRI interfaces may be converted to a packet eCPRI interface (carrying C1, C2 or Open Radio Access Network (oRAN) LLS) and switched over the fronthaul network.

Figure 1:
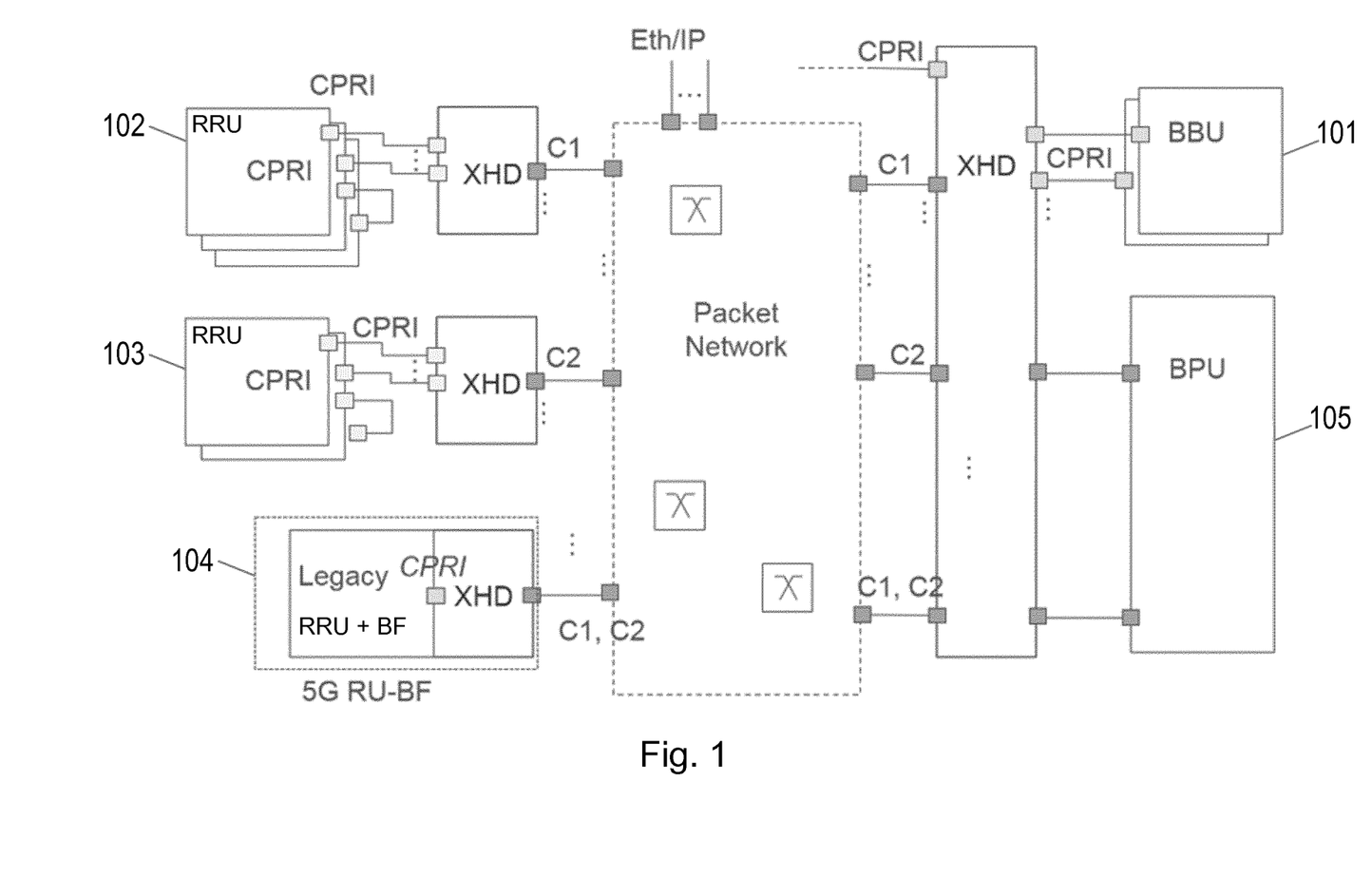
FIG. 1 illustrates an example fronthaul network according to some embodiments.

FIG. 1 illustrates a fronthaul network comprising example a) in which a legacy CPRI BBU 101 and RRU CPRI 102 are converted to C1, case b) and c) in which a Long Term Evolution (LTE) equipment 103 or 104 having a CPRI interface connects to a new 5G base-band processing equipment (BPU) 105 with a native eCPRI/C2 interface. In case c) a legacy RRU design is integrated into the crosshaul device 104 in the same device.

As CPRI has been designed for point to point links, and not for networks, there is no notion of packet drops, network bottlenecks, traffic management (buffering), congestion avoidance/detection/control, etc in the design as there is in Internet networking.

Mixing different fronthaul interface types may require smart functions in the nodes on the borders of the packet network to avoid and resolve congestion that can occur in the shared packet network, and that may affect the performance of radio network, for example the radio access interface connecting the base station to the user equipment, in an unpredictable way (for example, lower throughputs, retransmissions and increased delay for the UEs).

Access nodes in the fronthaul network may be configured to perform protocol translation between a time domain multiplexing (TDM) protocol (for example CPRI) and a packet based protocol (for example eCPRI), and may be configured to, for example, split control plane and user plane traffic into different packet types when moving from the TDM protocol to the packet based protocol. The CPRI protocol may also be described as a serial protocol, a time synchronous protocol and/or a streaming protocol.

The RRU may be configured to signal to the BBU information about its buffers and the radio frequency RF signal it receives. The RRU may also report measurements or estimates of the fronthaul quality based on throughput, latency, number of out-of-order packets among other metrics. The fronthaul quality indicator may be used to lower the amount of resources allocated and change compression parameters, for example.

Embodiments described herein relate to methods concerning how to resolve congestion in the packet based fronthaul network by smart strategies in the fronthaul access node (XHD), during the protocol conversion between TDM (CPRI) and packet based protocols (eCPRI). In particular embodiments described herein do not explicitly depend on the RAN scheduler, nor the RRU, RBU, BBU or BPU. Furthermore, since the access node may have port aggregation functionality, it may take decisions that target more than one BBU-RRU (BPU-RBU) pair, such as prioritizing AxC streams from a subset of antennas in a certain cell group in detriment of others in congestion situations.

The methods and apparatus described herein therefore enable co-existence of eCPRI and CPRI traffic on the same fronthaul network from a traffic management point of view. A node in the fronthaul network may be configured to perform congestion detection and avoidance while translating traffic between a TDM based protocol and a packet base protocol. The node may be configured to modify radio data during the protocol conversion to mitigate congestion independently of other Radio Access Network (RAN) nodes. Furthermore, due to the device port aggregation functionality, the node may target and prioritize over multiple BBU-RRU (BPU-RBU) pairs (actions are not limited to a single RAN).

Figure 2:
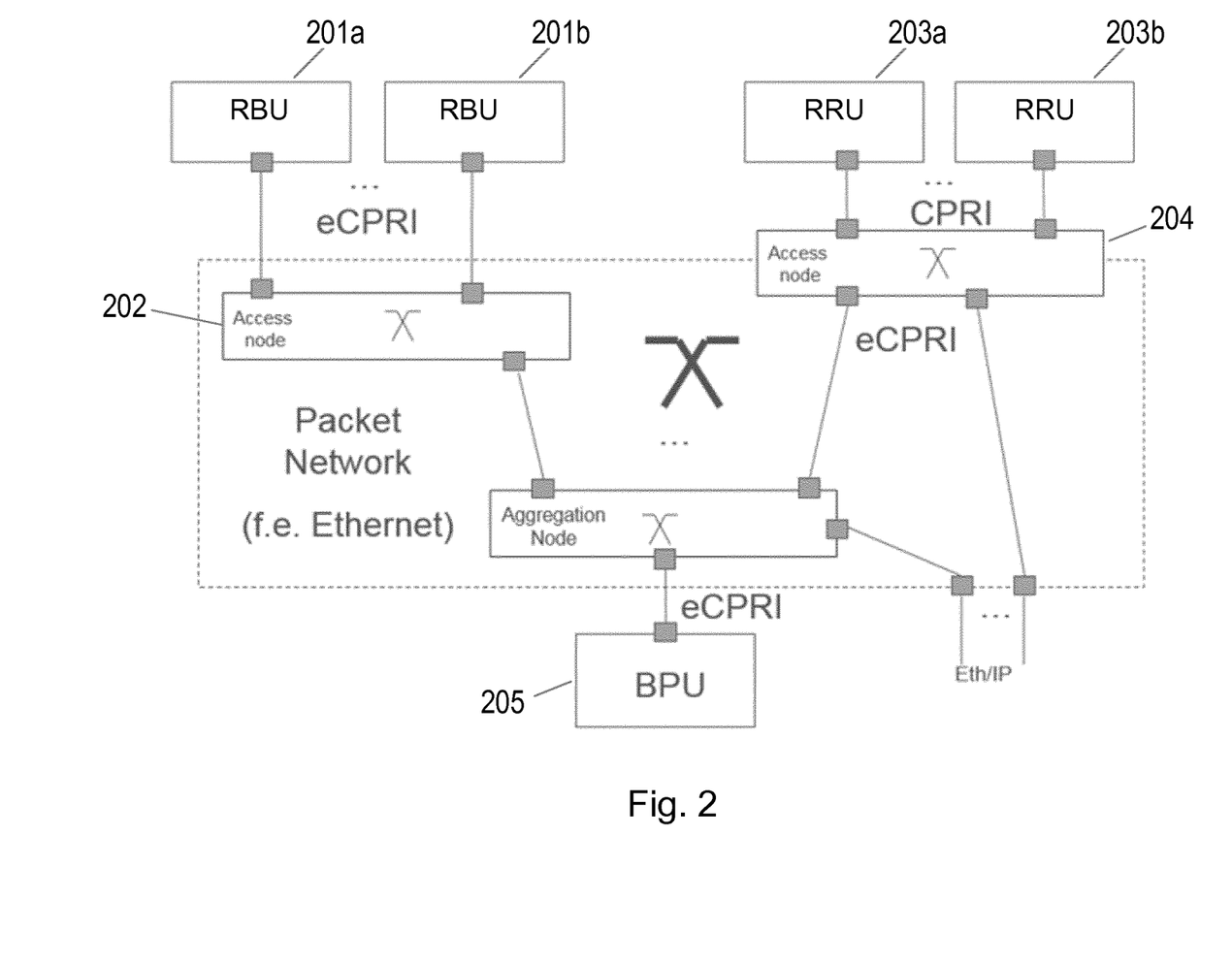
FIG. 2 illustrates a fronthaul network transporting both Long Term Evolution (LTE) and New Radio (NR) according to some embodiments.

FIG. 2 illustrates a fronthaul network transporting both Long Term Evolution (LTE) and New Radio (NR), for example, CPRI and eCPRI traffic, as well as sync traffic (1588) and other Ethernet/IP Internet services (e.g. wireline broadband access service, leased lines, etc). At the radio site, New Radio (NR) RBUs 201a and 201b with eCPRI interfaces connect to access node 202. Legacy 2G/3G/LTE RRUs 203a and 203b connect with CPRI to access node 204 that provides packet switching, CPRI/eCPRI traffic conversion, and traffic management (multiplexing and de-multiplexing). Several layers of aggregation might be present, i.e. switches with higher-rate trunk lines. At the network side, the New Radio (NR) BPUs 205 with eCPRI are connected (only one shown in FIG. 2 for simplicity) to aggregation node 206.

Although switches are designed for high capacity, non-blocking (no overbooking) is too costly and bottlenecks may occur. A problem may therefore occur whenever any of the aggregated trunk lines (both ingress and egress) gets spontaneously overloaded, i.e. the buffers fill up and packets get dropped impacting radio performance and ultimately UE throughput and latency. The C1, C2, E5, and L1 interfaces are variable bit-rate flows (variable packet sizes) with high volatility in their peak rates. With New Radio (NR) having possibilities for traffic management features (fronthaul-aware scheduling in BPU and RBU), legacy RUs may need to rely on the closest crosshaul device (XHD) to help.

Figure 3:
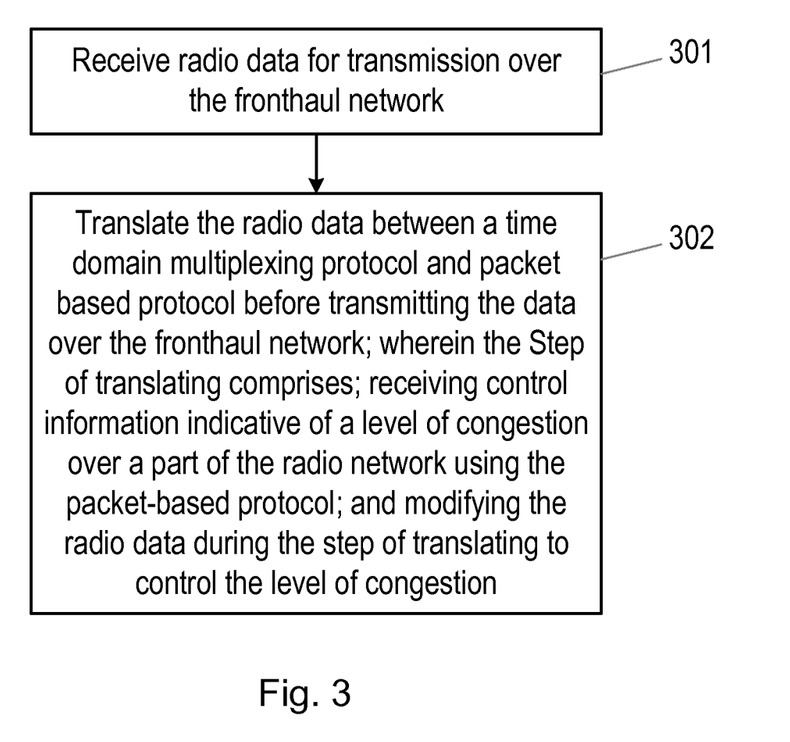
FIG. 3 illustrates a method a node in a fronthaul network of a radio network according to some embodiments.

FIG. 3 illustrates a method in a node (for example an XHD or access node) in a fronthaul network of a radio network. For example the node may comprise the access node 204 illustrated in FIG. 2.

In step 301 the node receives radio data for transmission over the fronthaul network. The radio data may be for uplink or downlink transmission over the fronthaul network.

In step 302, the node translates the radio data between a TDM protocol (for example a synchronous, serial protocol) and packet based protocol before transmitting the data over the fronthaul network. For example, if the radio data comprises uplink data, the node may translate the radio data from the TDM protocol to the packet based protocol. Alternatively, if the radio data comprises downlink data, the node may translate the radio data from the packet based protocol to the TDM protocol. It will be appreciated that in scenarios where the connected radio unit is operating using a packet based protocol (for example eCPRI) the node may perform no translation of the radio data between protocols.

In other words in some examples, the node connects to a first radio unit using the packet based protocol and connects to a second radio unit using the time domain multiplexing protocol.

Step 302 comprises the node receiving control information indicative of a level of congestion over a part of the radio network using the packet based protocol; and modifying the radio data during the step of translating to control the level of congestion.

The node may receive the control information from a radio unit transmitting or receiving the radio data. The control information may additionally or alternatively be received from a baseband processing unit transmitting or receiving the radio data. The control information may be additionally or alternatively received over an Operations and Management, OAM, interface.

Figure 4:
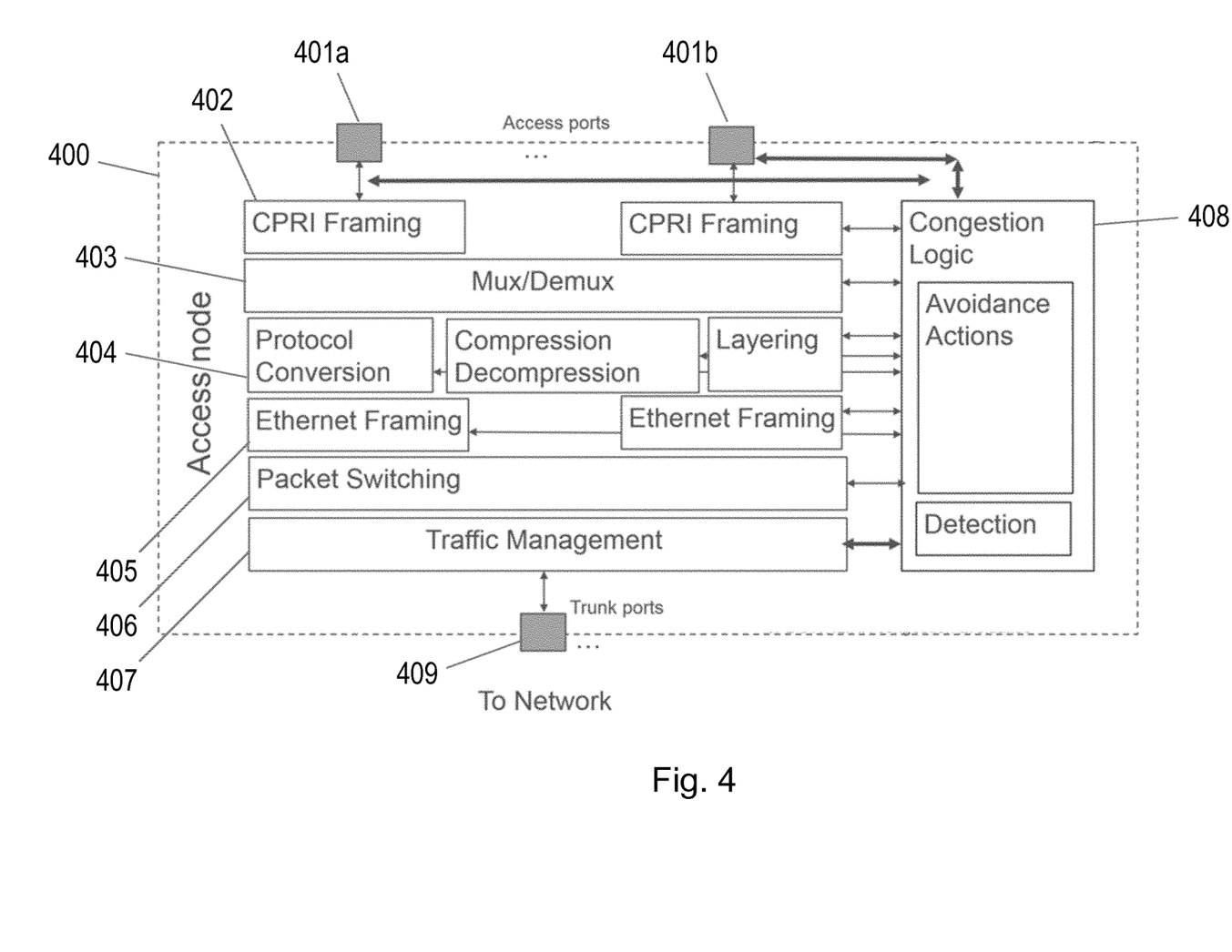
FIG. 4 illustrates an example of an access node (or crosshaul device) in a fronthaul network which may be configured to perform the method as described with reference to FIG. 3.

FIG. 4 illustrates an example of an access node (or XHD) in a fronthaul network which may be configured to perform the method as described with reference to FIG. 3.

The access node 400 comprises two access ports 401a and 401b. It will be appreciated that at least one access port may be used. These access ports may be configured to receive radio data from or transmitting radio data to one or more radio units which may be configured to use a TDM based protocol or a packet based protocol.

The access node 400 may then be configured with functional blocks configured to perform CPRI framing 402, multiplexing and de-multiplexing 403 protocol conversion compression and layering 404, Ethernet framing 405, packet switching 406 and traffic management 407. The access node then comprises a trunk port 408 for receiving radio data from or transmitting radio data to a baseband processing unit, another access node or XHD, or an aggregation switch in the network.

The access node 400 further comprises a congestion logic block 409 which is configured to control the functional blocks 402 to 407 based on the received control information indicative of a level of congestion over a part of the radio network using the packet based protocol in order to modify the radio data during the step of translating to control the level of congestion.

The access node 400 may therefore be further configured to receive control information from connected radio units, BPUs or over an operations and management (OAM) interface. The OAM interface may comprise a physical OAM interface (not represented in FIG. 4) or a logical OAM interface (transported over the physical ports 401a, 401b, 409).

The following gives examples of types of control information that may be indicative of a level of congestion over a part of the radio network using the packet based protocol.

It will be appreciated that further examples may be envisaged, and that any combination of different types of control information may be used.

The control information may comprise an indication of dropped packets on egress or ingress of the node. For example, the control information may be based on sequence numbers or a report from a connected baseband processing unit or radio unit. The control information may comprise an indication of dropped packets from another node in the fronthaul network.

The control information may comprise an indication of samples being delayed or dropped in a time interval. This may be considered an indirect indication of a level of congestion. For example, for a C1 interface, if there are packet delays or drops, then time domain samples will be lost. The proportion of time domain samples lost to the number of expected time domain samples in a certain time interval (for example a frame or a transmission time interval TTI) can indicate the level of compression. In another example, for a C2 or oRAN LLS interface, if there are packet delays or drops frequency domain samples will be lost. Each OFDM symbol in a transmission time interval is composed of a variable number of frequency domain samples (varies with RAN load). For this example therefore, the control information may comprise an indication of the proportion of OFDM symbols in which frequency domain samples were lost as compared to the number of OFDM symbols in a time interval (for example a TTI or a frame).

The control information may comprise active queue management, AQM, data management markers. For example, the AQM management markers may comprise RED or DiffSery markers. The active queue management markers may be placed in packets that do not carry radio data, but radio control information for example.

The control information may comprise a congestion notification received from a connected node for example a Radio unit, a BPU, a switch or another XHD or access node.

The control information may comprise an indication of a degradation of the synchronization plane. This may be considered an indirect but reliable indication of congestion, since the synchronization plane traffic may be strongly prioritized.

The control information may comprise an indication of a point-to-point or end-to-end measurement or report based on data injected by the node. For example, the indication may be based on sequences of timestamped packets, or TWAMP (A Two-Way Active Measurement Protocol (TWAMP), RFC 5357, https://tools.iettorg/html/rfc5357) based measurements performed by the fronthaul network nodes.

Referring to FIG. 3, in step 302 the step of modifying may comprise one or more of the following examples. It will be appreciated that further examples may be envisaged for modification of the radio data and that any combination of different types of modification of the radio data may be used. As previously the congestion logic 408 in FIG. 4 may be configured to, with the received control information, for example the scheduler information from BPUs (L2/L3) as well as network load data and the further control information listed above, modify radio related parameters that are part of the radio stack, during the CPRI to eCPRI translation.

In some examples, the step of modifying comprises modifying the radio data to switch on or off a radio access technology, RAT. For example, the modification may comprise silently dropping the fronthaul radio data from a specific RAT without actually powering the nodes or RAT off. For example, the modification may be to keep the radio data comprising 2G/3G content) but reduce or remove radio data comprising 4G content. In some examples, the step of modifying may comprise notifying the targeted RRU to interrupt the CPRI control plane or L1 connection to switch on or off a radio access technology.

In some examples, the step of modifying comprises modifying the content of the radio data to switch on or off radio services or radio bearer or move radio services or radio bearers between radio access technologies.

In some examples, the step of modifying comprises modifying the content of the radio data to switch on or off an antenna carrier. For example, the antenna carrier may comprise a CPRI AxC, and switching off an AxC may be comparable to switching off a layer in a MIMO transmission or a carrier in carrier aggregation.

In some examples, the step of modifying comprises modifying the content of the radio data to switch on or off a multiple input multiple output, MIMO, layer. For example, if 4×4 MIMO is being used and the level of congestion is indicated as high, the modification may be to switch to 2×2 MIMO, and then down to SIMO should the level of congestion remain high. This switching off or on of a MIMO layer may be performed by silently dropping the fronthaul radio data associated with that layer during the conversion between the TDM protocol and the packet based protocol. In some examples, the switching off or on of a MIMO layer may be performed by directly signaling to the BPU and/or RRU to indicate that the MIMO layer should be switched on or off. The switching off or on of a MIMO layer may be performed by dropping layer data.

In some examples, the step of modifying comprises modifying the radio data by switching on or off a multi user multiple input multiple output, MU-MIMO, layer. For example, if 32 layers are being used and the level of congestion is indicated as high the modification may be to switch to using 16 layers to reduce congestion.

In some examples, the step of modifying comprises modifying the radio data to increase or decrease a compression ratio used to compress the radio data for transmission over the fronthaul network. In some examples, the compression ratio may be altered indirectly, for example by choosing which Huffman dictionary to use or choosing which floating point format to use. For example, if congestion is indicated as high by the control information, the modification may comprise increasing compression to reduce the fronthaul load and reduce the congestion.

In some examples, the step of modifying comprises modifying the radio data to drop parts of the radio data that are associated with a lower priority than other parts of the radio data. For example, control channel transmissions may be considered to have a higher priority.

In some examples, the step of modifying comprises modifying the radio data by switching on or off a data management procedure. For example, if congestion is indicated as high, the modification may comprise prioritizing radio data comprising content relating to scheduling strategies on the radio bearer(s) over other radio data. For example, the modification may prioritise control data such as Radio Resource Control data over user data.

In some examples, the step of modifying comprises delaying transmission of the radio data to another node to allow for load adaptation actions to occur. For example, load adaptation actions may comprise packet drops based on user plane information.

In some examples, the step of modifying comprises delaying transmission of the radio data to a baseband processing unit or radio unit to allow for load adaption actions to occur. For example, scheduler-based load adaptation actions such as a change in modulation and coding scheme.

The control information may be divided into at least two types of control information. The first type may comprise for example, scheduling information. The scheduling information may comprise a map of the time-frequency resources in one transmission time interval. The scheduling information may indicate which UEs get what resource share and when. The scheduling information may also specify which constellation is being used, and optionally what retransmission attempt, transmission mode, bearer identification, number of MIMO layers, which precoder and/or which beams are to be used to reach a user.

A second type of control information may comprise congestion information. The congestion information may comprise for example one or more of, AQM traffic management markers, an explicit congestion notification message, an indication of samples being delayed or dropped in a time interval, an indication of dropped packets on egress or ingress of the node (or connected radio nodes), an indication of a degradation of the synchronization plane, and an indication of a point-to-point or end-to-end measurement or report based on data injected by the node The node (e.g. XHD or access node) may translate the radio data from the TDM protocol (for example CPRI) to a packet based protocol for example eCPRI.

For example, the following are possible traffic conversion types the node may perform:
a) CPRI to C1 (compressed time domain samples in packets)
b) CPRI to C2 (frequency domain samples in packets)
c) CPRI to oRAN LLS (which is for practical purposes similar to CPRI-C2 conversion)

In conversion type a) the time domain samples are taken from a CPRI stream, possibly compressed, and then packetized and sent towards the BPU.

If only control information comprising congestion information is available, the step of modifying may comprise one or more of the following options, as described above, for conversion type a): the radio data may be modified to change compression parameters (for example to increase compression); the radio data may be modified to change floating point format representation (for example to choose a floating point format that requires less bits but increases quantization noise); the radio data may be modified to switch on or off a radio access technology, RAT; the radio data may be modified to switch on or off an antenna carrier, AxC; the oversampling factor of the CPRI stream step of modifying (this could be notified to the BPU using eCPRI control messages).

If, in addition to congestion information, scheduling information is also available, one or more of the following extra modifications to the radio data may be performed by the node: the radio data may be modified to switch on or off an antenna carrier, based on utilization of said antenna carrier; the radio data may be modified to change compression parameters (for example, increase compression) of an antenna carrier or group of antenna carriers based on utilization; the radio data may be modified to change floating point format representation of an antenna carrier or group of antenna carriers based on utilization.

In conversion types b) and c) the time domain samples are taken from a CPRI stream, and part of the demodulation is performed by the node, including the cyclic prefix (CP) removal and a Discrete Fourier Transform (DFT). The result of this operation may be referred to as frequency domain samples. This operation enables more flexibility in which resources will be dropped, prioritized or have their formats altered during the conversion.

To allow for the interface load to scale with the number of user layers, conversions of type b) and c) may have access to control information comprising scheduling information. As long as an indication of congestion is available (any control information comprising congestion information), all congestion avoidance actions may be performed by the node. For example, the node may modify the radio data to change the formats, change compression, drop any MIMO layer content, prioritize users, etc.

In some aspects, the functionality or method described is implemented in a network node which carries out a translation of radio data between a TDM protocol and a packet switched protocol. The translation is carried out based on information about congestion within the network, e.g. the radio access network. The congestion information therefore indicates issues, or potential issues, with the transport of radio data within the network (not over the air interface). The network node is configured, based on the congestion information, to modify the radio data itself during the translation between protocols. This modification may affect (e.g. reduce) the amount of radio data which needs to be carried by the network after the translation between protocols. The modification may be based on information about the radio data, e.g. the type of radio data, radio layers (e.g. MIMO property), a characteristic of the radio data or its transmission etc. This allows a modification to be made which mitigates the effect of the modifications on the communication between wireless device(s) (UEs) and the network.

Figure 5:
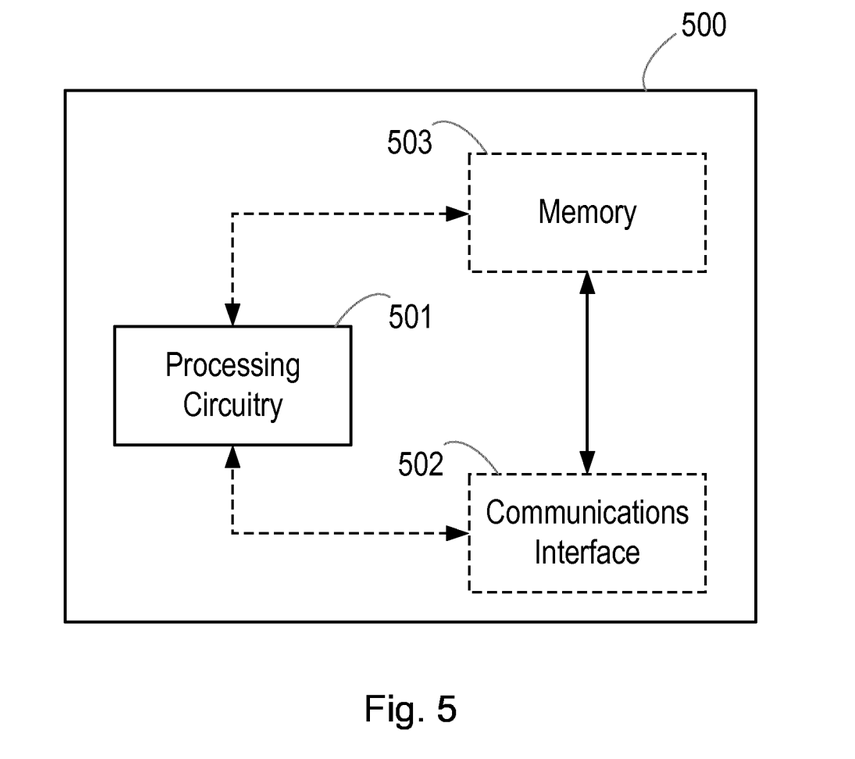
FIG. 5 illustrates an example of a node according to some embodiments comprising processing circuitry (or logic).

FIG. 5 illustrates an example of a node 500 according to some embodiments comprising processing circuitry (or logic) 501. The processing circuitry 501 controls the operation of the node 500 and can implement the method described herein in relation to a node 500, for example the access node 400. The processing circuitry 501 can comprise one or more processors, processing units, multi-core processors or modules that are configured or programmed to control the node 500 in the manner described herein. In particular implementations, the processing circuitry 501 can comprise a plurality of software and/or hardware modules that are each configured to perform, or are for performing, individual or multiple steps of the method described herein in relation to the node 500.

Briefly, the processing circuitry 501 of the node 500 is configured to: receiving radio data for transmission over the fronthaul network; and translating the radio data between a time domain multiplexing protocol and packet based protocol before transmitting the data over the fronthaul network; wherein the step of translating comprises: receiving control information indicative of a level of congestion over a part of the radio network using the packet based protocol; and modifying the radio data during the step of translating to control the level of congestion.

In some embodiments, the node 500 may optionally comprise a communications interface 502. The communications interface 502 of the node 500 can be for use in communicating with other nodes, such as other virtual nodes. For example, the communications interface 502 of the node 500 can be configured to transmit to and/or receive from other nodes requests, resources, information, data, signals, or similar. The processing circuitry 501 of the node 500 may be configured to control the communications interface 502 of the node 500 to transmit to and/or receive from other nodes requests, resources, information, data, signals, or similar.

Optionally, the node 500 may comprise a memory 503. In some embodiments, the memory 503 of the node 500 can be configured to store program code that can be executed by the processing circuitry 501 of the node 500 to perform the method described herein in relation to the node 500. Alternatively or in addition, the memory 503 of the node 500, can be configured to store any requests, resources, information, data, signals, or similar that are described herein. The processing circuitry 501 of the node 500 may be configured to control the memory 503 of the node 500 to store any requests, resources, information, data, signals, or similar that are described herein.

There is therefore provided methods and apparatus that allow for mixing of LTE and NR equipment on the same fronthaul network. The methods allow for usage of low-cost protocol switching apparatus instead of non-blocking high-cost switching apparatus. Embodiments described herein also provide the opportunity to bundle radio, baseband and fronthaul apparatus by means of radio-transport interaction giving best performance when bought from single vendor.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a node in a fronthaul network of a radio network, the method comprising:
   receiving radio data for transmission over the fronthaul network; and
   translating the radio data between a time domain multiplexing protocol and packet based protocol before transmitting the data over the fronthaul network, wherein the packet based protocol comprises an evolved Common Public Radio Interface (eCPRI) protocol, wherein the time domain multiplexing protocol comprises a Common Public Radio Interface (CPRI) protocol, and wherein a traffic of the eCPRI protocol and a traffic of the CPRI protocol co-exists on the fronthaul network;
   wherein the step of translating comprises:
     receiving control information indicative of a level of congestion over a part of the radio network using the packet based protocol; and
     modifying the radio data during the step of translating to control the level of congestion, wherein the modifying the radio data comprises delaying transmission of the radio data to another node to allow for load adaptation actions to occur based on user plane information.

2. The method as claimed in claim 1, wherein the radio data comprises uplink radio data in the time domain multiplexing protocol and the step of translating comprises translating the radio data from the time domain multiplexing protocol to the packet based protocol.

3. The method as claimed in claim 1, wherein the node connects to a first radio unit using the packet based protocol and connects to a second radio unit using the time domain multiplexing protocol.

4. The method as claimed in claim 1, wherein the control information comprises an indication of dropped packets on egress or ingress of the node.

5. The method as claimed in claim 1, wherein the control information comprises an indication of samples being delayed or dropped in a time interval.

6. The method as claimed in claim 1, wherein the control information comprises an indication of a degradation of the synchronization plane.

7. The method as claimed in claim 1, wherein the step of modifying comprises modifying the content of the radio data to switch on or off a radio access technology (RAT).

8. The method as claimed in claim 1, wherein the step of modifying comprises modifying the content of the radio data to switch on or off radio services or radio bearer or to move the radio services or the radio bearers between radio access technologies.

9. The method as claimed in claim 1, wherein the step of modifying comprises modifying the content of the radio data to switch on or off an antenna carrier.

10. The method as claimed in claim 1, wherein the step of modifying comprises modifying the content of the radio data to switch on or off a multiple input multiple output (MIMO) layer.

11. The method as claimed in claim 1, wherein the step of modifying comprises modifying the content of the radio data to increase or decrease a compression ratio used to compress the radio data for transmission over the fronthaul network.

12. The method as claimed in claim 1, wherein the step of modifying comprises modifying the content of the radio data to drop parts of the radio data that are associated with a lower priority than other parts of the radio data.

13. A node in a fronthaul network of a radio network, the node comprising processing circuitry configured to:
    receive radio data for transmission over the fronthaul network; and
    translate the radio data between a time domain multiplexing protocol and packet based protocol before transmitting the data over the fronthaul network, wherein the packet based protocol comprises an evolved Common Public Radio Interface (eCPRI) protocol, wherein the time domain multiplexing protocol comprises a Common Public Radio Interface (CPRI) protocol, and wherein a traffic of the eCPRI protocol and a traffic of the CPRI protocol co-exists on the fronthaul network;
    wherein the processing circuitry is configured to translate the radio data by:
      receiving control information indicative of a level of congestion over a part of the radio network using the packet based protocol; and
      modifying the radio data during the step of translating to control the level of congestion, wherein the modifying the radio data comprises delaying transmission of the radio data to another node to allow for load adaptation actions to occur based on user plane information.

14. The node as claimed in claim 13, wherein the radio data comprises uplink radio data in the time domain multiplexing protocol and the step of translating comprises translating the radio data from the time domain multiplexing protocol to the packet based protocol.

15. The node as claimed in claim 13, wherein the node connects to a first radio unit using the packet based protocol and connects to a second radio unit using the time domain multiplexing protocol.

16. The node as claimed in claim 13, wherein the control information comprises an indication of samples being delayed or dropped in a time interval.

17. The node as claimed in claim 13, wherein the processing circuitry is further configured to perform the step of modifying by modifying the content of the radio data to switch on or off a radio access technology (RAT).

18. The node as claimed in claim 13, wherein the processing circuitry is further configured to perform the step of modifying by modifying the content of the radio data to switch on or off radio services or radio bearer or to move radio services or radio bearers between radio access technologies.

19. The node as claimed in claim 13, wherein the processing circuitry is further configured to perform the step of modifying by modifying the content of the radio data to switch on or off an antenna carrier.

20. The node as claimed in claim 13, wherein the processing circuitry is further configured to perform the step of modifying by modifying the content of the radio data to switch on or off a multiple input multiple output (MIMO) layer.

\* \* \* \* \*